US010163290B1

(12) United States Patent
Burroughs et al.

(10) Patent No.: US 10,163,290 B1
(45) Date of Patent: Dec. 25, 2018

(54) UNIVERSAL RADIO RECEIVER APPARATUS AND METHOD

(71) Applicant: The Chamberlain Group, Inc., Oak Brook, IL (US)

(72) Inventors: Michael A. Burroughs, Chicago, IL (US); Thomas J. Grinter, Wheaton, IL (US); Christopher J. Staub, Aurora, IL (US)

(73) Assignee: The Chamberlain Group, Inc., Oak Brook, IL (US)

( * ) Notice: Subject to any disclaimer, the term of this patent is extended or adjusted under 35 U.S.C. 154(b) by 0 days.

(21) Appl. No.: 15/634,702

(22) Filed: Jun. 27, 2017

(51) Int. Cl.
*H02P 1/00* (2006.01)
*G07C 9/00* (2006.01)

(52) U.S. Cl.
CPC ..... *G07C 9/00857* (2013.01); *G07C 9/00023* (2013.01); *G07C 2009/00888* (2013.01)

(58) Field of Classification Search
None
See application file for complete search history.

(56) References Cited

U.S. PATENT DOCUMENTS

| | | | | |
|---|---|---|---|---|
| 6,486,795 B1 * | 11/2002 | Sobel | G08C 17/02 340/12.28 |
| 7,327,108 B2 * | 2/2008 | Mullet | G07C 9/00309 160/188 |
| 7,327,249 B1 * | 2/2008 | Murray | G07C 9/00182 340/12.52 |
| 7,409,711 B1 | 8/2008 | Sakadjian | |
| 8,026,946 B2 | 9/2011 | Nassimi | |
| 8,421,591 B2 * | 4/2013 | Karasek | G07C 9/00182 340/5.1 |
| 8,665,065 B2 | 3/2014 | Jenkins | |
| 2006/0103503 A1 | 5/2006 | Rodriquez | |
| 2008/0224886 A1 | 9/2008 | Rodriguez et al. | |
| 2012/0094604 A1 | 4/2012 | Amin | |

* cited by examiner

*Primary Examiner* — K. Wong
(74) *Attorney, Agent, or Firm* — Fitch, Even, Tabin & Flannery LLP

(57) ABSTRACT

In one aspect, a universal receiver is provided for being operably coupled to a movable barrier operator. The universal receiver includes at least one radio antenna adapted to receive signals transmitted at different frequencies and a controller operably coupled to the at least one radio antenna. The controller is adapted to determine a code of a signal received by the at least one radio antenna at any one of the different frequencies. The controller being further adapted to learn the code in response to a user-independent learning condition being met.

22 Claims, 5 Drawing Sheets

UNIVERSAL RADIO RECEIVER APPARATUS AND METHOD

FIELD

The following disclosure relates to movable barrier operators and, more specifically, receivers for movable barrier operators.

BACKGROUND

Movable barriers, such as gates, are commonly used to restrict access to a building or area. By installing a movable barrier operator and configuring it to move a gate, it is possible to allow access by a specific person or persons to the building or area while preventing access by others. A radio frequency (RF) transmitter may be used to operate the movable barrier operator and cause the movable barrier operator to move the gate from an open position to a closed position and from a closed position to an open position. The transmitter may transmit a code recognizable by the movable barrier operator, or a receiver operably coupled to the movable barrier operator, that may cause the movable barrier operator to function if the transmitted code is recognized as authorized. Transmitters that transmit unauthorized codes are unable to cause the movable barrier operator to function. Various types of codes may be utilized, such as fixed codes and variable codes (e.g., rolling codes).

Facilities such as gated communities, commercial complexes, and military installments frequently have large numbers of people that must be able gain access. As such, these facilities end up purchasing and distributing a large number of transmitters to accommodate the large number of people. Keeping track of the authorized transmitters can become difficult as the number of transmitters increases and when there are different brands or types of transmitters used by those who access the facility. Additionally, the movable barrier operator may need to be replaced. This may require the replacement movable barrier operator to be programmed to recognize a large number of transmitters.

Some facilities have movable barrier operator systems with multiple receivers installed in communication with a single movable barrier operator. Individual ones of the multiple receivers often communicate with different brands of transmitters and allow the different transmitters to control the movable barrier operator. More specifically, each receiver can receive a signal from a particular type of transmitter and determine whether the signal contains an authorized code. If the signal contains an authorized code, the receiver sends a signal to the movable barrier operator which causes the movable barrier operator to function and move the gate. However, the multiplicity of transmitters and receivers complicates updating or replacing the movable barrier operator system.

For example, if one of the receivers are replaced, the transmitters associated with the receiver may not work with the new receiver. In such a situation, the transmitters may need to be replaced so that the transmitters will work with the new receiver. As another example, the facility may be able to upgrade a receiver with a newer version of the same brand of receiver to preserve compatibility with the transmitters. However, the facility may want to change brands of receivers but doing so may require replacing the associated transmitters.

Figure 1:
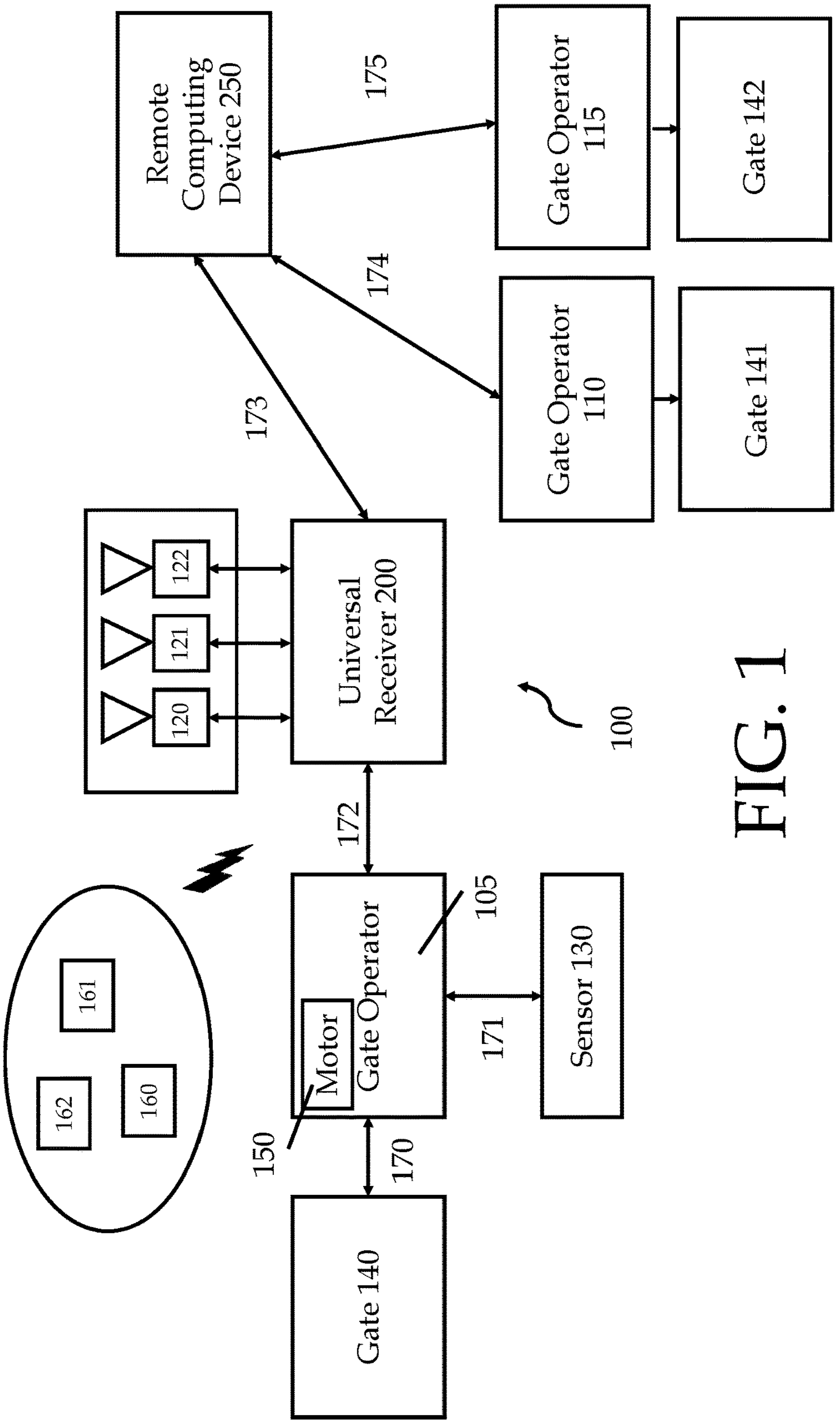
FIG. 1 is a schematic representation of a moveable barrier operator system having a universal receiver, a remote computing device, and multiple moveable barrier operators.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

In accordance with one aspect of the present disclosure, a universal receiver is provided for being operably coupled to a movable barrier operator. The universal receiver includes at least one radio antenna adapted to receive signals transmitted at different frequencies and a controller operably coupled to the at least one radio antenna. The controller is adapted to determine a code of a signal received by the at least one radio antenna at any one of the different frequencies. The controller is further adapted to learn the code in response to a user-independent learning condition being met. As used herein, the phrase "user-independent learning condition" means a learning condition that may be satisfied by something other than direct user interaction. It will be appreciated that a user-independent learning condition therefore does not encompass, for example, a user pressing a learn mode button on the movable barrier operator to cause the universal receiver to enter a learn mode.

In this manner, a facility manager may add the universal receiver to a facility's existing movable barrier operator system. The universal receiver may quickly and easily learn the codes of many different transmitters in response to the learning condition being met for each of the codes. This allows the universal receiver to be retrofit into a facility's current system without having to replace all of a facility's transmitters or having a facility employee manually train the universal receiver to recognize and authorize each transmitter currently in use. The retrofit universal receiver can be configured to operate in conjunction with one or more preexisting receivers of the facility's current system that receive transmissions from the transmitters of the facility. Once most or all of the transmitters currently in use are learned by the universal receiver, the facility can remove the preexisting receivers entirely.

In one form, the learning condition includes movement of the movable barrier. By conditioning learning of the received code on movement of the movable barrier, the universal receiver can know the received code is an authorized code since the movable barrier operator has moved the movable barrier.

In accordance with another aspect of the present disclosure, the universal receiver includes a network interface, the network interface being operable to facilitate communicating a code of a signal received by the at least one transmitter to a remote computing device. This allows authorized codes to be stored on a network, such as a networked cloud environment, and managed remotely. Usage and traffic data may be monitored and transmitted to allow facility managers to optimize the processes and procedures of the facility. Depending on the type of facility, subscription and use-limited access to the facility may be monitored and controlled. For example, a user may purchase a parking package allowing a predetermined number of entries into the facility. A code corresponding to the user may be sent from a remote computing device to a universal receiver at the facility. Each time the user accesses the facility, the universal receiver may communicate with the remote computing device. Once the user accesses the facility the predetermined number of times, the remote computing device may cause the universal receiver to unlearn the code for that user or prevent that user's code from operating the movable barrier operator associated with the universal receiver.

With reference to FIG. 1, a movable barrier operator system 100 is provided that includes one or more movable barrier operators, such as gate operators 105, 110, and 115 configured to move movable barriers such as gates 140, 141, and 142. The gate operators 105, 110, and 115 each include a motor 150 operably coupled to one of the gates 140, 141, 142 for moving the gate 140, 141, 142 between closed and open positions.

The system 100 further includes a universal receiver 200 and a remote computing device 250. The universal receiver 200 receives signals from one or more transmitters 160, 161, 162 and operates the gate operator 105 based on signals received from the transmitters. The universal receiver 200 may also be coupled to receivers 120, 121, and 122 configured to receive signals from the transmitters 160, 161, and 162. The gate operator 105 and the receivers 120, 121, 122 may be previously installed as part of a facility's preexisting movable barrier operator system. The universal receiver 200 may be retrofitted into the facility's movable barrier operator system by disconnecting the receivers 120, 121, 122 from the gate operator 105 and connecting the receivers 120, 121, 122 to the universal receiver 200. The universal receiver 200 may then communicate directly with the receivers 120, 121, 122 and send control signals to the gate operator 105. In one form, the transmitters 160, 161, 162 are each configured to transmit in a different format and receivers 120, 121, 122 are each configured to receive a different signal format. Each receiver 120, 121, 122 can thereby communicate with one of the transmitters 160, 161, 162. For example, the receiver 120 and transmitter 160 are a first brand, the receiver 121 and transmitter 161 are a second brand, and the receiver 122 and transmitter 162 are a third brand. The transmitters 160, 161, 162 may be, for example, RF transmitters such as garage door openers operable to control the gate operator 105 from some distance or, for example, a fob or pass employing active or passive RFID technology generally operable within some close proximity to a receiver as compared to the RF transmitter.

The receivers 120, 121, 122 may each include an antenna adapted to receive a particular type of signal (e.g., 315, 390, or 418 MHz) and a controller configured to determine whether a received signal contains an authorized code. If a received signal contains an authorized code, the receiver 120, 121, 122 sends a signal to the universal receiver 200 and the universal receiver 200 may cause the gate operator 105 to function in response to the received signal. The user independent learning condition may be the universal receiver 200 receiving a signal from any one of the receivers 120, 121, 122. Thus, if the universal receiver 200 receives a transmission from one of the transmitters 160, 161, 162, and a signal from one of the receivers 120, 121, 122 indicating the code of the transmission is authorized, the universal receiver 200 learns the code of the transmission and directs the gate operator 105 to open the gate 140.

The universal receiver 200 includes at least one radio antenna 210 adapted to receive signals transmitted at different frequencies (e.g., 315, 390, and 418 MHz) and a controller 215 operably coupled to the at least one radio antenna 210 and adapted to determine a code of a signal received at the antenna 210 at any one of the different frequencies. However, the controller 215 is further adapted to learn the code in response to a user-independent learning condition being met each time the authorized transmitters 160, 161, 162 are used to operate the gate operator 105. In this manner, the universal receiver 200 automatically learns the authorized codes without a user manually having to manually train the universal receiver 200 with each transmitter 160, 161, 162.

As another example, the user independent learning condition may be the movement of the gate 140. The movement may be transduced, sensed, or recognized and transmitted as data to the gate operator 105 or the universal receiver 200. The data may immediately cause a code received at the radio antenna 210 to be learned (i.e. the reception of a specific signal indicates that the learning condition is met) or the data may be further processed to determine whether the learning condition has been met. For example, the learning condition may be an electrical current caused by a switch closing or opening in response to the gate 140 moving from the closed position to the open position. As another example, if a series of images are received, whether the learning condition is met may be determined by processing the images to determine if the gate is moving in the series of images. In another example, the user-independent learning condition may be an attribute or attributes of a vehicle in proximity to the gate 140. Images of a car may be analyzed and compared to images of vehicles authorized to access the facility. Here, the learning condition is the determination of a match between an image of the vehicle and an image of vehicles authorized to access the facility. For example, a unique attribute of the vehicle such as its license plate number may be recognized and compared to license plate numbers authorized to access the facility. In this form, the learning condition is a match between the license plate number of the vehicle in front of the gate 140 and a license plate number of a vehicle authorized to access the facility. Vehicle as used herein includes autonomous vehicles and does not require the vehicle to be able to accommodate a human passenger or driver. The learning condition may also be a signal generated from a device different from the transmitter such as a mobile phone for employing near-field communications or Bluetooth® communication protocol. For example, the mobile phone may communicate its international mobile equipment identity (IMEI) to the universal receiver and thereby cause the universal to learn a received code. The universal receiver may further process the IMEI or other received data to determine whether the learning condition is met. Credentials such as a badge or credit card may also be used to supply data to be used to determine whether the learning condition is met.

A learning condition may employ more than one condition. For example, if a truck carrying cargo arrives at a gate employing the universal receiver 200, the learning condition may be that the truck is the proper weight and has license plates with license plate numbers that match a license plate of a vehicle authorized to access the facility. Presence of a vehicle in proximity to the gate 140 may also be used to determine, at least in part, if the learning condition is met. Presence may be detected by, for example, an inductive loop such as a vehicle loop detector. Any weighing of multiple conditions may be employed. Machine learning may be used to add or eliminate conditions of the learning condition over time.

With reference to FIG. 1, the universal receiver 200 may be coupled via a link 172 to the gate operator 105. The gate operator 105 or the universal receiver 200 may be coupled to a sensor 130. The sensor 130 is operable to generate data for determining whether a learning condition has been met. The data may be communicated via link 171 to the gate operator 105, which may in turn communicate the data to the universal receiver 200 via the link 172. In the form where there the sensor 130 is coupled to the universal receiver 200, the data will be transmitted via the couple therebetween. In one example, the sensor 130 is coupled to the controller 215 and configured to detect movement of the movable barrier 140. The sensor 130 may generate data for determining whether a user-independent learning condition is met based on movement of the movable barrier 140. In another form, the sensor 130 generates data regarding attributes of a vehicle such that the controller 215 learns the code in response to movement of the movable barrier 140, an attribute of a vehicle, or a combination thereof. The sensor 130 may be, for example, a current sensor, an image sensor, an encoder, a photoelectric sensor, weight plate, or any other sensor or combination of sensors suitable to detect the movement of the movable barrier or an attribute of a vehicle. As another example, the sensor 130 may detect movement of a rotatable drive of the gate operator 105.

Figure 2:
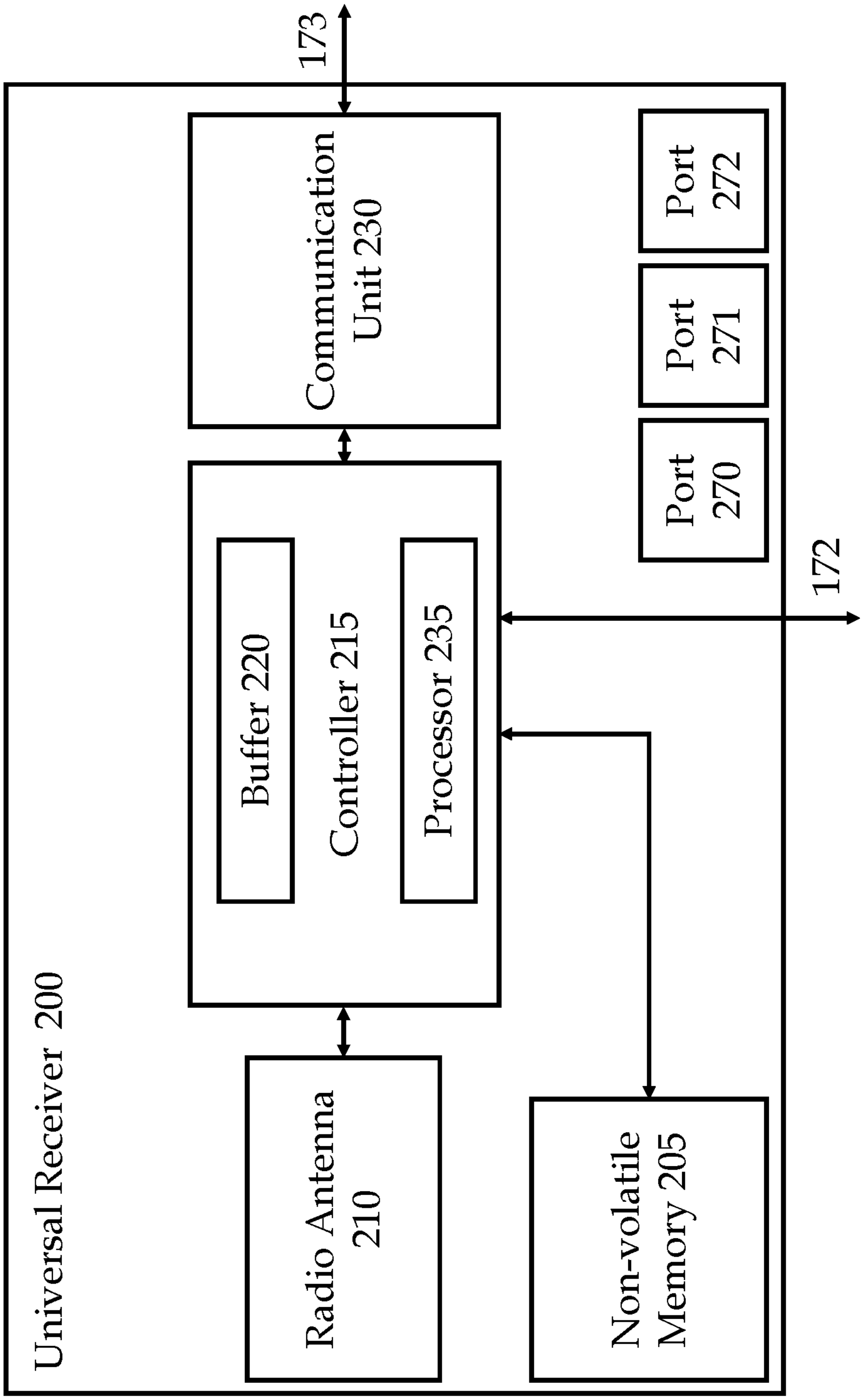
FIG. 2 is a schematic representation of the universal receiver of FIG. 1.

With reference to FIGS. 1 and 2, the universal receiver 200 includes, the at least one radio antenna 210 coupled to the controller 215. The universal receiver 200 may recognize signals sent by the transmitters 160, 161 and 162 that use various standards such as those promulgated by, for example, Chamberlain® or DoorKing®. These signals may vary in frequency (e.g. 315, 390, or 418 MHz) and data structure. In some embodiments, the universal receiver may be equipped with, for example, one or more ports or connections 370, 371 and 372 for communicating with other receivers such as the receivers 120, 121, or 122. The ports may be operatively coupled to the controller 215. The controller 215 includes, for example, a buffer 220 and a processor 235 and may be coupled to a non-volatile memory 205 and a communications unit 230. The communications unit 230 acts as an interface between the universal receiver 200 and the remote computing device 250. In some examples, the communication unit 230 may enable and facilitate communication between the universal receiver 200 and one or more other devices. For example, the communication unit 230 may establish a Bluetooth® connection between the universal receiver 200 and the sensor 130. The communications unit 230 may be coupled to the remote computing device 250 via the communications link 173. The communications link 173 may be a wired or wireless connection or a combination or series thereof between the communication unit 230 and the remote computing device 250. The communication unit 230 may make use of various communication protocol (e.g. Bluetooth® Wi-fi, or Internet Protocol) to communicate over the communication link 173. The remote computing device 250 may further communicate between the universal receiver 200 and one or more other devices. For example, the remote computing device 250 may communicate between the universal receiver 200, the gate operator 110, and the gate operator 115 over communications links 173, 174, and 175. The remote computing device 250 may be, for example, a dedicated physical computing resource such as a server residing in the office of a facility manager or it may be a cloud-based computing resource.

The remote computing device 250 can be used to store learned or authorized codes from the universal receiver 200 and communicate the authorized codes to the gate operators 110, 115. Upon the universal receiver 200 receiving a signal from a transmitter 160, 161, or 162 at radio receiver 210, the signal is passed to the controller 215. At the controller 215, a code is determined from the signal. The determined code may be stored in the buffer 220 by the processor 235. The processor 235 can, for example, cause a buffered code to be stored in a non-volatile memory 205 in response to the user-independent learning condition being met. In other words, the processor 235 causes the buffered code to be stored if the code is authorized. If the user-independent learning condition is not met, the processor 235 does not cause the code to be stored in the non-volatile memory 205. In other examples, the processor 235 may cause the buffered code to be sent to the remote computing device 250 in response to the user-independent learning condition being met. The code may also be stored in both the non-volatile memory 205 and the remote computing device 250. Further, the remote computing device 250 may send an authorized code to the gate operators 110, 115 so that the gate operators 110, 115 may learn the authorized code as well. The gate operators 110, 115 may be operatively coupled to a universal receiver substantially identical to the universal receiver 200. In such a case, the remote computing device may send authorized code to the universal receiver operatively coupled to the gate operators 110, 115.

In another example, the processor 235 is configured to store a code for a predetermined period of time in the buffer 220. The processor 235 may, for example, cause the buffered code to be stored in a non-volatile memory 205 or the remote computing device 250 in response to the user-independent learning condition being met during the predetermined period of time. The predetermined period of time may be, for example, in the range of two seconds to ten seconds. If the user-independent learning condition is not met during the predetermined period of time, the processor 235 overwrites or otherwise removes the code from the buffer 220. In some embodiments, the time period may be very small such as on the order of one to five-hundred microseconds.

Figure 3:
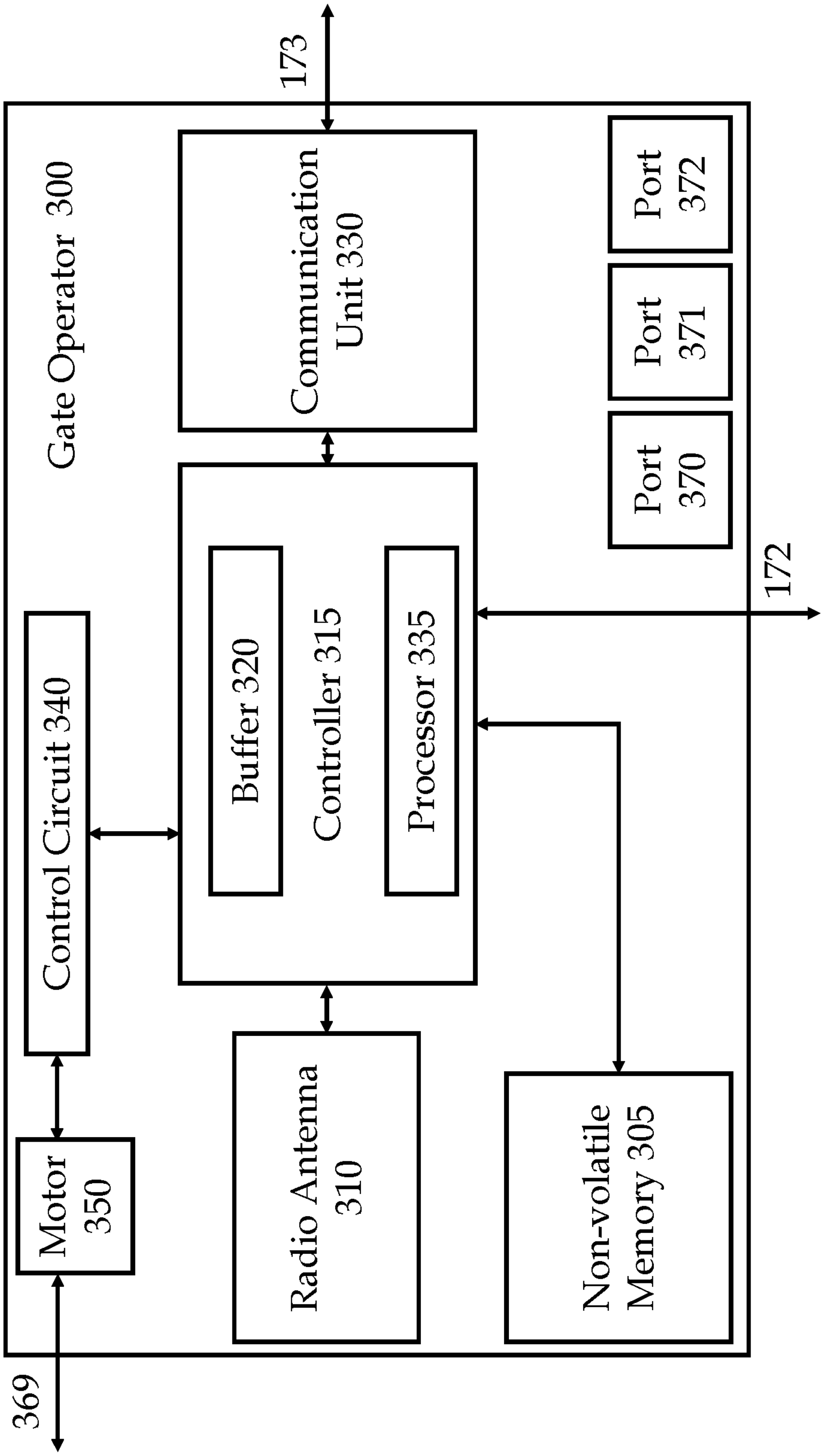
FIG. 3 is a schematic representation of a gate operator that contains circuitry similar to the universal receiver of FIG. 2.

With reference to FIG. 3, a gate operator 300 is provided that combines the functionality of the universal receiver 200 and the gate operator 105 as described above. Similarly named parts in the FIGS. 1, 2, and 3 perform substantially the same function and operate in substantially the same way. The gate operator 300 includes at least one radio receiver 310 coupled to the controller 315 which contains, for example, a processor 335 and a buffer 320. The controller 315 is coupled to a control circuit 340, a communication unit 330, and a non-volatile memory 305. The control circuit 340 controls a motor 350 under direction of the controller 315. The motor 330 is operatively coupled to the gate 140 by link 369. The gate operator 300 can be used in the system 100 described above in place of the gate operator 105 and the universal receiver 200. In some embodiments, the gate operator 300 may be equipped, for example, with one or more ports or connections 370, 371 and 372 for communicating with other receivers such as the receivers 120, 121, or 122.

Upon the gate operator 300 receiving a signal from a transmitter such as transmitter 160, 161, or 161, the processor 335 determines a code from the signal and temporarily stores the code in buffer 320 if the processor 335 determines that code is not already authorized. While the code is temporarily stored in the buffer 320, the processor 335 may not attempt to store another code until the buffered code is learned, as describe above, a predetermined period of time elapses, or a buffer reset condition is met. For example, the predetermined period of time may be from 2 to 10 seconds. The buffer reset condition may be, for example, when the gate 140 moves from an open position to a closed position.

While a code is buffered, the processor 335 may prevent any other code from operating the gate operator 300 so as not to incorrectly learn a code. Similarly, if the gate operator 300 receives an authorized code, the processor 335 may prevent codes from being buffered until a buffer reset condition is met. Alternatively, if multiple codes are received at the same time, the processor 335 may remove the received codes from the buffer 320 and wait until only a single transmission is received.

The functionality described in view of the gate operator 300 may also be utilized with the universal receiver 200 and gate operator 105 discussed above.

Figure 4:
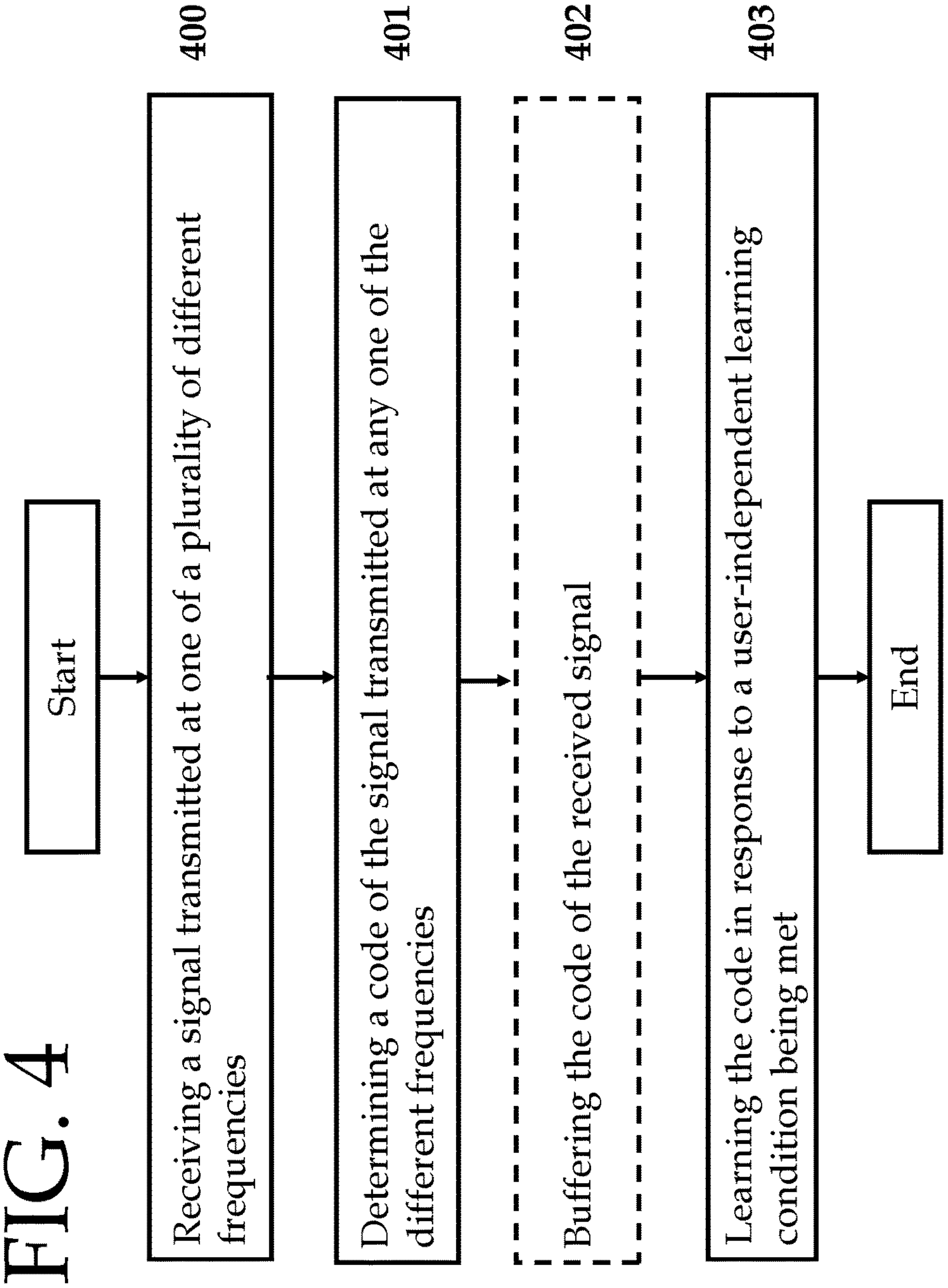
FIG. 4 is a flow diagram of a method of learning a code transmitted at any of a plurality of frequencies.

With reference to FIG. 4, a flow chart is provided illustrating an example operation of the universal receiver 200 having user-independent learn mode capabilities as described above. At step 400, a radio signal at one of a plurality of frequencies (e.g. 315, 390, or 418 MHz) is received from a transmitter. The signal may have various formats known in the industry such as those promulgated by Chamberlain® or DoorKing®. At step 401 a controller, such as the controller 215, determines a code of the received signal using the processor 235. The code may be a fixed code or a variable code (e.g. a rolling code). Optionally, at step 402 the controller 215 may temporarily buffer the determined code. For example, the code may be buffered for a predetermined period of time ranging from two to ten seconds. At step 403, the controller 215 learns the code in response a user-independent learning condition being met. In one example, a code is learned if the user-independent learning condition is received during the period in which the code is buffered.

At step 403, upon the user-independent learning condition being met, the code may be stored in the local non-volatile memory 205 or transmitted and stored in the remote computing device. In one example, at step 403, in response to movement of the gate 140 being detected or determined, the universal receiver 200 learns the code. The code may be stored in the local non-volatile memory 205 and transmitted to and stored in the remote computing device 250.

It will be appreciated that the method discussed above with respect to the universal receiver 200 may also be implemented using the movable barrier operator 300.

Figure 5:
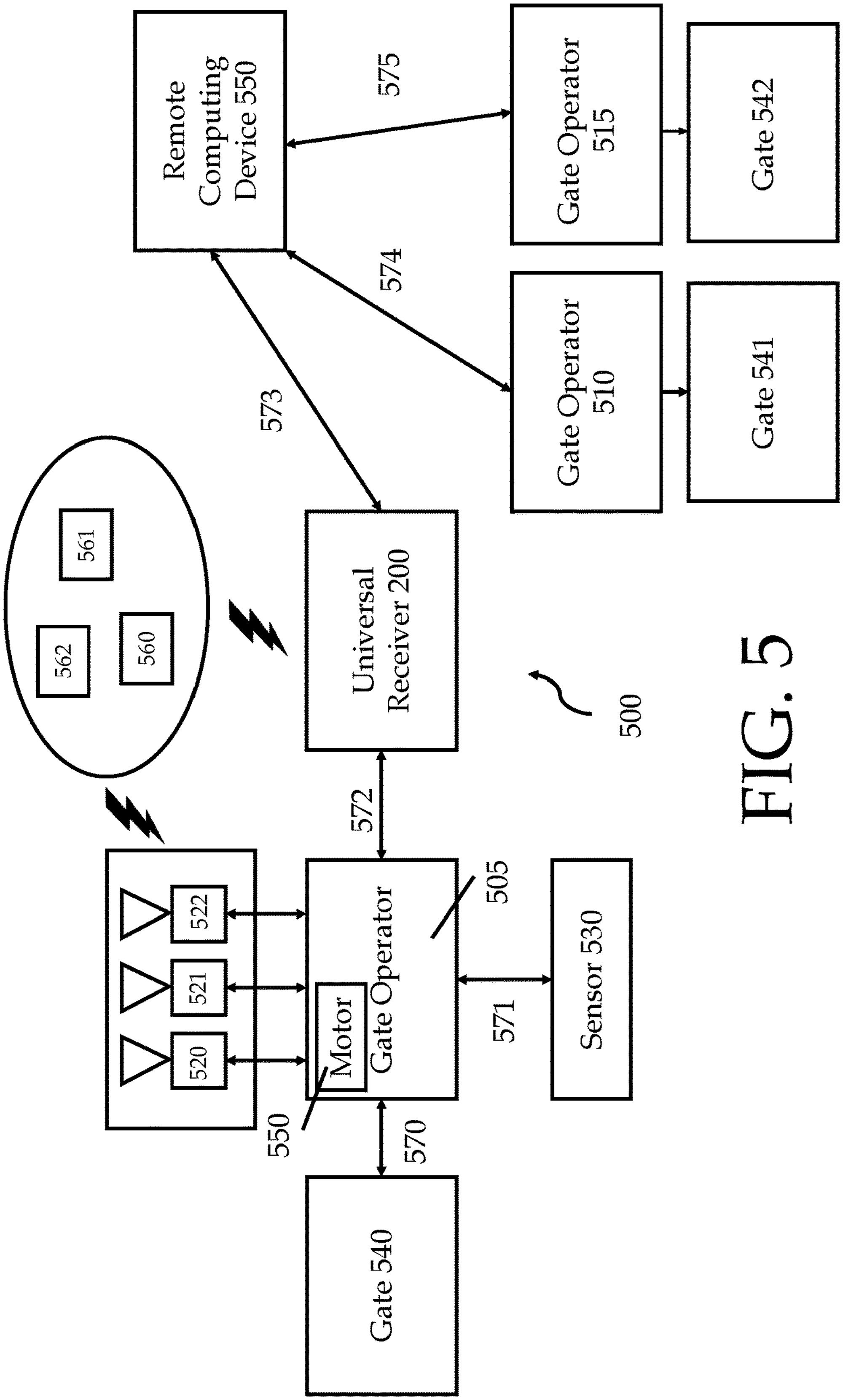
FIG. 5 is a schematic representation of a movable barrier operator system including the universal receiver of FIG. 2.

With reference to FIG. 5, a system 500 is provided that is substantially identical to the system 100 of FIG. 1 and includes the universal receiver 200. The system 500 includes receivers 520, 521, 522 that function identically to the receivers 120, 121, 122. One difference between the systems 100, 500 is that the receivers 520, 521, 522 are connected directly to the gate operator 505 rather than the universal receiver 200. The receivers 520, 521, 522 authenticate signals from transmitters 560, 561, 562 and send corresponding control signals to the gate operator 505 which opens or closes the gate 540. This arrangement may be desirable when the receivers 520, 521, 522 are difficult or impractical to disconnect from the gate operator 505. The universal receiver 200 may learn a code from the transmitters 560, 561, 562 in response to movement of the gate 540. The other components of the system 500 that have reference numerals which correspond to the components of the system 100, e.g., sensor 530 and sensor 130, are similar in construction and operation to the components of the system 100.

Although method steps may be presented and described herein in a sequential fashion, one or more of the steps shown and described may be omitted, repeated, performed concurrently, and/or performed in a different order than the order shown in the figures and/or described herein. Those skilled in the art will recognize that a wide variety of modifications, alterations, and combinations can be made with respect to the above described examples without departing from the scope of the invention, and that such modifications, alterations, and combinations are to be viewed as being within the ambit of the inventive concept.

What is claimed is:

1. A universal receiver for being operably coupled to a movable barrier operator, the universal receiver comprising:

a port configured to be connected to a preexisting receiver and receive a control signal from the preexisting receiver in response to the preexisting receiver receiving a signal transmitted at a first frequency and including a code;

at least one radio antenna configured to receive signals transmitted at different frequencies including the signal transmitted at the first frequency and including the code; and a controller operably coupled to the port and the at least one radio antenna, the controller configured to determine the code of the signal received by the at least one radio antenna, the controller configured to learn the code in response to a user-independent learning condition being met, the user-independent learning condition including the port receiving the control signal from the preexisting receiver.

2. The universal receiver of claim 1 wherein the user-independent learning condition includes movement of a movable barrier and the controller is configured to learn the code in response to movement of the movable barrier.

3. The universal receiver of claim 1 wherein the controller includes a buffer configured to store the code, the controller being operable to cause the code stored in the buffer to be stored in a non-volatile memory in response to the user-independent learning condition being met.

4. The universal receiver of claim 1 wherein the controller includes a buffer configured to store the code for a predetermined period of time, the controller being operable to cause the code stored in the buffer to be stored in a non-volatile memory in response to the user-independent learning condition being met during the predetermined period of time.

5. The universal receiver of claim 4 wherein the predetermined period of time is in the range of two seconds to ten seconds.

6. The universal receiver of claim 1 further comprising a non-volatile memory, the controller being operable to cause the code to be stored in the non-volatile memory in response to the user-independent learning condition being met.

7. The universal receiver of claim 1 further comprising a network interface, the network interface being operable to facilitate communicating the transmitted code to a remote computing device.

8. The universal receiver of claim 1 wherein the at least one radio antenna includes a plurality of antennae each adapted to receive a signal at one of the different frequencies.

9. A movable barrier operator system comprising:
- a movable barrier;
- a motor operably coupled to the movable barrier;
- a port configured to be connected to a preexisting receiver and receive a control signal from the preexisting receiver in response to the preexisting receiver receiving a signal transmitted at a first frequency and including a code;
- at least one radio antenna configured to receive signals transmitted at different frequencies including the signal transmitted at the first frequency and including the code;
- a controller operably coupled to the port and the at least one radio antenna, the controller configured to determine the code of the signal received by the at least one radio antenna; and
- the controller being further configured to learn the code in response to a user-independent learning condition being met, the user-independent learning condition including the port receiving the control signal from the preexisting receiver.

10. The movable barrier operator system of claim 9 further comprising a sensor operably coupled to the controller and configured to detect movement of the movable barrier, the user-independent learning condition including movement of the movable barrier such that the controller learns the code in response to movement of the movable barrier.

11. The movable barrier operator system of claim 9 wherein the controller includes a buffer configured to store the code, the controller being operable to cause the code stored in the buffer to be stored in a non-volatile memory in response to the user-independent learning condition being met.

12. The movable barrier operator system of claim 9 wherein the controller includes a buffer configured to store the code for a predetermined period of time, the controller being operable to cause the code stored in the buffer to be stored in a non-volatile memory in response to the user-independent learning condition being met during the predetermined period of time.

13. The movable barrier operator system of claim 12 wherein the predetermined period of time is in the range of two seconds to ten seconds.

14. The movable barrier operator system of claim 9 further comprising a non-volatile memory, the controller being operable to cause the code to be stored in the non-volatile memory.

15. The movable barrier operator system of claim 9 further comprising a network interface, the network interface being operable to facilitate communicating the code to a remote computing device.

16. The movable barrier operator system of claim 9 wherein the at least one radio antenna includes a plurality of antennae each adapted to receive a signal at one of the different frequencies.

17. A method of operating a universal receiver, the method comprising:
- receiving a radio signal for operating a movable barrier operator transmitted at one of a plurality of different frequencies;
- determining a code of the signal transmitted at any one of the different frequencies; and
- learning the code in response to a user-independent learning condition being met and without a user pressing a learn mode button of the movable barrier operator.

18. The method of claim 17 further comprising sensing movement of the movable barrier; and
- learning the code includes learning the code in response to movement of the movable barrier.

19. The method of claim 17 further comprising buffering the code; and
- causing the code to be stored in non-volatile memory in response to the user-independent learning condition being met.

20. The method of claim 17 further comprising buffering the transmitted code for a predetermined period of time; and
- causing the code to be stored in a non-volatile memory in response to the user-independent learning condition being met during the predetermined period of time.

21. The method of claim 20 wherein the predetermined period of time is in the range of two seconds to ten seconds.

22. The method of claim 17 further comprising communicating the code to a remote computing device in response to the user-independent learning condition being met.

* * * * *